United States Patent [19]

Lehnhoff et al.

[11] Patent Number: 4,678,972

[45] Date of Patent: Jul. 7, 1987

[54] SELF-STARTING SINGLE-PHASE BRUSHLESS DC MOTOR AND CONTROL THEREFOR

[75] Inventors: Richard N. Lehnhoff, Kettering; Jack W. Savage, Centerville, both of Ohio

[73] Assignee: General Motors Corporation, Detroit, Mich.

[21] Appl. No.: 908,730

[22] Filed: Sep. 18, 1986

[51] Int. Cl.⁴ .......................................... H02P 1/22
[52] U.S. Cl. ................................ 318/254; 318/136; 318/431; 318/778; 318/781; 318/272
[58] Field of Search ............... 318/136, 138, 254, 430, 318/431, 439, 501, 701, 753, 755, 756, 776, 778, 781, 272

[56] References Cited

U.S. PATENT DOCUMENTS

| | | | |
|---|---|---|---|
| 2,736,853 | 2/1956 | Selgin | 318/701 |
| 2,989,654 | 6/1961 | Neyhouse et al. | 310/204 |
| 3,144,597 | 8/1964 | Lee | 318/816 |
| 3,153,161 | 10/1964 | Gabriel | 310/162 |
| 3,205,383 | 9/1965 | Hurst | 310/162 |
| 3,211,982 | 10/1965 | Neyhouse et al. | 318/781 |
| 3,229,180 | 1/1966 | Neyhouse et al. | 318/781 |
| 3,263,144 | 7/1966 | Neyhouse et al. | 318/776 |
| 3,402,337 | 9/1968 | Malmborg et al. | 318/254 |
| 3,493,831 | 2/1970 | Roberts | 318/138 |
| 4,467,233 | 8/1984 | Moren et al. | 310/162 |
| 4,499,407 | 2/1985 | MaCleod | 318/254 |
| 4,500,824 | 2/1985 | Miller | 318/138 X |
| 4,563,620 | 1/1986 | Komatsu | 318/254 X |

*Primary Examiner*—William M. Shoop, Jr.
*Assistant Examiner*—Bentsu Ro
*Attorney, Agent, or Firm*—Mark A. Navarre

[57] ABSTRACT

The stator winding of a single-phase brushless DC motor with symmetrical rotor and stator air gap geometry is comprised of two serially connected relatively displaced sections energized with a source of direct current in accordance with the rotary position of the motor rotor. In the run mode, the full winding is energized; in the start mode, one of the sections is momentarily short-circuited if the initial winding energization fails to produce sufficient torque for starting.

3 Claims, 6 Drawing Figures

SELF-STARTING SINGLE-PHASE BRUSHLESS DC MOTOR AND CONTROL THEREFOR

This invention relates to single-phase brushless DC motors, and more particularly to a single phase brushless DC motor which is self-starting.

The single-phase motor is sometimes considered for light duty applications because of its simple geometry and consequent ease of manufacture. However, the conventional single-phase motor has certain rotor positions for which it is not self-starting, even when the stator windings are energized full wave. Such rotor positions are generally referred to as null positions.

Essentially, two approaches have been used to overcome the starting difficulty of the single-phase motor. In one approach, the motor is constructed with an asymmetrical stator and/or rotor air gap geometry which serves to pre-position the rotor so that starting is not attempted from a null position. In the other approach, the motor is effectively operated as a two-phase machine by providing a separate starting winding, and energizing it with phase displaced current. The phase displaced current is typically generated with an impedance element such as a capacitor.

The present invention provides a single-phase motor having symmetrical stator and rotor geometry which is self-starting without the use of dedicated starting windings or phase shifting impedance elements. According to this invention, the single-phase stator winding is split into two substantially equal element sections displaced in space by 90 electrical degrees. In the run mode, the element sections are energized in series to form a single resultant pole field mid-way between adjacent like-polarity pole element sections. In the start mode, one of the pole element sections is momentarily short circuited if the rotor fails to move because it is in a null position. This serves to phase displace the resultant pole field from the run mode by 45 electrical degrees, thereby generating torque to move the rotor from the null position. Monofilament and bifilar embodiments are disclosed.

IN THE DRAWINGS

Figure 1:
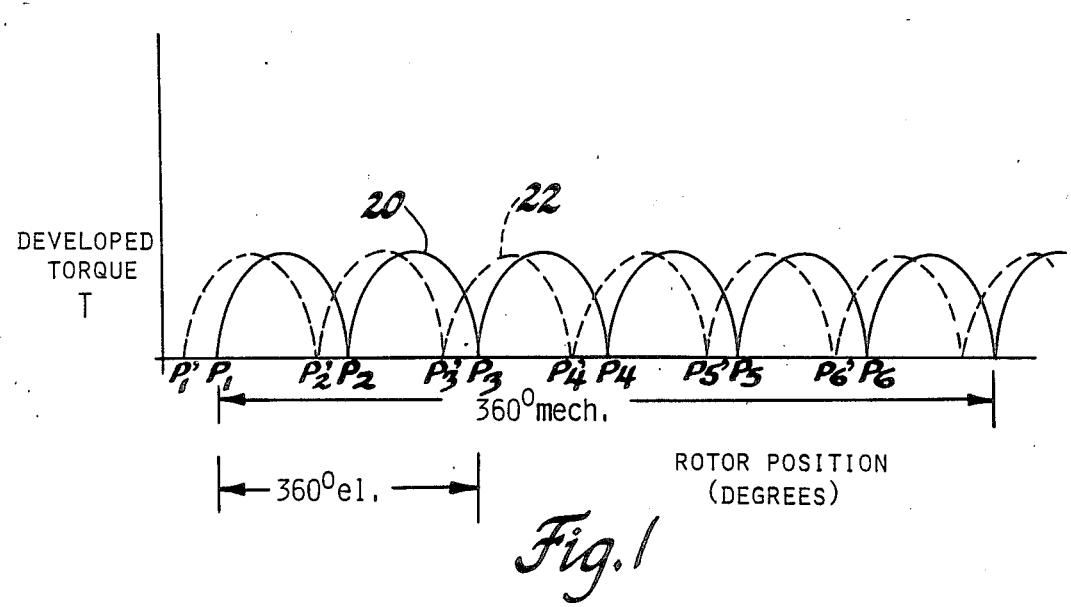
FIG. 1 is a graph depicting starting torque as a function of rotor position for a single-phase, six-pole, full-wave motor.

Referring now to the drawings, and more particularly to FIG. 1, the solid trace 20 represents the developed torque for a six-pole single-phase motor as a function of the rotor position in electrical degrees when the stator winding is energized by a full-wave controller. Full-wave energization, in this context, means that the stator winding is energized over a complete cycle (360 degrees) of its generated voltage. The energization current is reversed six times per cycle to produce positive torque substantially over the entire cycle. However, there are six rotor positions per revolution (designated null positions $P_1$–$P_6$) for which energization of the winding will not produce starting torque. On a more general basis, there are N null positions per revolution for an N-pole single-phase motor.

As described below, the starting difficulty of single-phase motors is overcome according to this invention by generating a momentary shift in the motor field when a starting attempt fails because the rotor is in a null position. The starting torque for a 45 degree shift of the motor field is depicted by the trace 22 in FIG. 1. Due to the shift, the torque is no longer zero, and the null positions are effectively retarded, as designated by the positions $P_1'$–$P_6'$. Once the rotor starts to move, the motor field is returned to its original orientation, and the winding is synchronously commutated to accelerate the rotor to its running speed.

Figure 2:
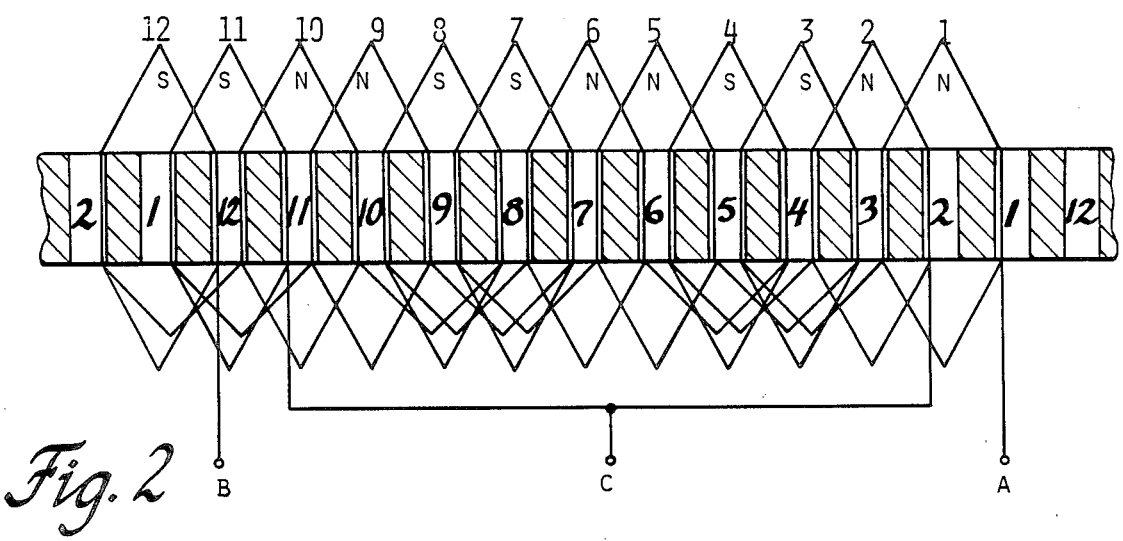
FIGS. 2-3 depict a monofilament embodiment of a self-starting single-phase motor according to this invention, and a computer-based control unit therefor.
Figure 3:
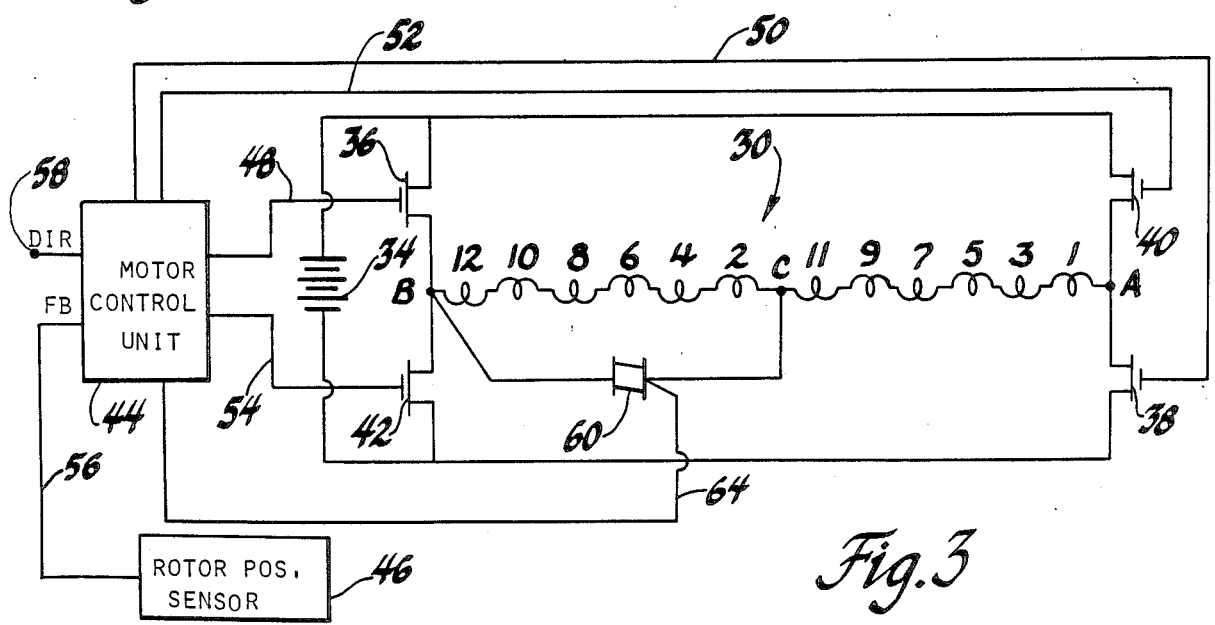

A first embodiment of the self-starting single-phase motor of this invention is depicted in FIGS. 2–3. Such motor has a two section monofilament winding, designated generally by the reference numeral 30 in FIG. 3. One section comprises the six odd-numbered coil elements 1–11, and is defined by the terminals A and C. The other section comprises the six even-numbered coil elements 2–12, and is defined by the terminals B and C. Successive coil elements are wound in the opposite sense, as indicated.

The spacial relationship of the coil elements 1–12 is schematically depicted in FIG. 2, where the reference numeral 32 generally designates the stator of the motor. The stator teeth are shown in section, and for convenience, each coil is depicted as comprising only one turn. The two sections are separately wound, and are displaced in space by 90 electrical degrees—30 mechanical degrees in the case of a six-pole motor. The coil 11 is connected to the coil 2 at terminal C as shown in FIG. 3. Also as shown in FIG. 2, the terminal A is connected to the beginning of coil 1, and the terminal B is connected to the end of coil 12.

The winding 30 is energized with a battery 34 through a full-wave bridge comprising the power transistors 36–42. The transistors 36 and 38 are rendered mutually conductive to energize the winding 30 with current from battery 34 in a direction from terminal B to terminal A for clockwise (CW) rotation. Alternately, the transistors 40 and 42 are rendered conductive to energize the winding 30 with current from battery 34 in a direction from terminal A to terminal B for counterclockwise (CCW) rotation.

A computer-based control unit 44 controls the conduction of transistors 36–42 via lines 48–54. The primary input to control unit 44 is a feedback signal (FB) on line 56 in the form of a rotor position information from rotor position sensor 46. Essentially, the control unit 44 controls the conduction of transistors 36–42 so that the winding 30 is energized in synchronism with the rotor position to develop torque for accelerating the rotor in the desired direction. The direction signal (DIR) on line 58 indicates the desired direction of motor rotation.

The self-starting motor operation is carried out, according to this invention, by momentarily short circuiting one of the sections of winding 30 to effect a shift in the motor field of 45 electrical degrees. In a six-pole motor, this corresponds to a shift of 15 mechanical degrees. The reference numeral 60 designates a bidirectional switching device such as a TRIAC for performing the momentary short circuiting function. The TRIAC 60 shunts the even-numbered winding elements, and is controlled by the control unit 44 via the line 64.

If the initial energization of winding 30 does not produce rotor movement, the TRIAC 60 is momentarily gated into conduction to shift the motor field in the negative direction by 45 electrical degrees as indicated by the trace 22 in FIG. 1. This produces an instantaneous increase in starting torque for initiating rotor movement in the clockwise direction. Thereafter, the TRIAC 60 is commutated by the negative generated voltage across the even-numbered winding element section, and the full length of winding 30 is utilized to accelerate the rotor to its running speed.

Figure 6:
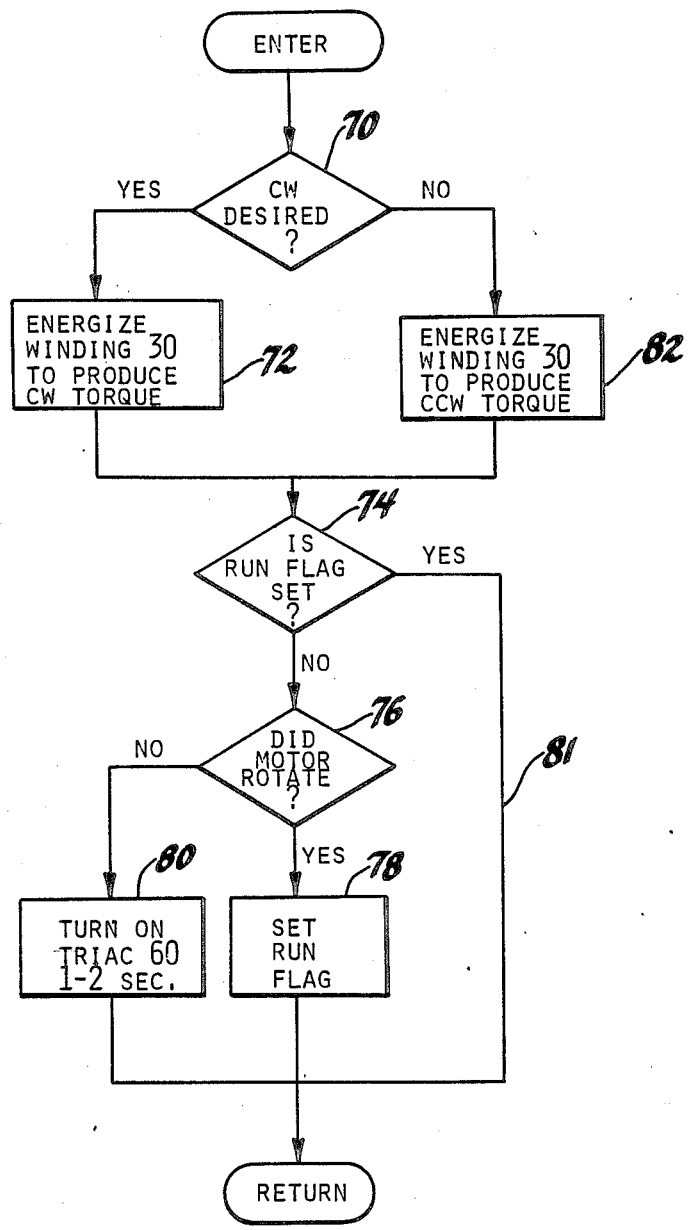
FIG. 6 depicts a flow diagram representative of computer program instructions executed by the control units of FIGS. 3 and 5 for operating the single-phase motors of this invention.

The operation of the control unit 44 in performing the self-start function is set forth in the flow diagram of FIG. 6. The flow diagram is repeatedly executed whenever motor operation is required.

To initiate rotor movement in the desired direction (as determined at decision block 70), instruction blocks 72 or 82 are executed to energize winding 30 as described above. As indicated in reference to FIG. 3, such energization is performed in relation to the rotor position information on line 56. Then the decision block 74 is executed to determine if a control unit register designated as the RUN flag is set. If not, the motor is in the starting mode, and the decision block 76 is executed to determine if the rotor moved in response to the energization of winding 30. This is also determined by the rotor position information on line 56. If the rotor moved, it was not in a null position, and the instruction block 78 is executed to set the RUN flag, completing the routine. If the rotor did not move, it is likely that it is in a null position, and the instruction block 80 is executed to gate TRIAC 60 into conduction for a predetermined interval such as 1-2 seconds. As soon as the rotor does move, the instruction block 78 is executed as described above to set the RUN flag; thereafter, execution of the blocks 76-80 is skipped as indicated by the flow diagram line 81.

Figure 4:
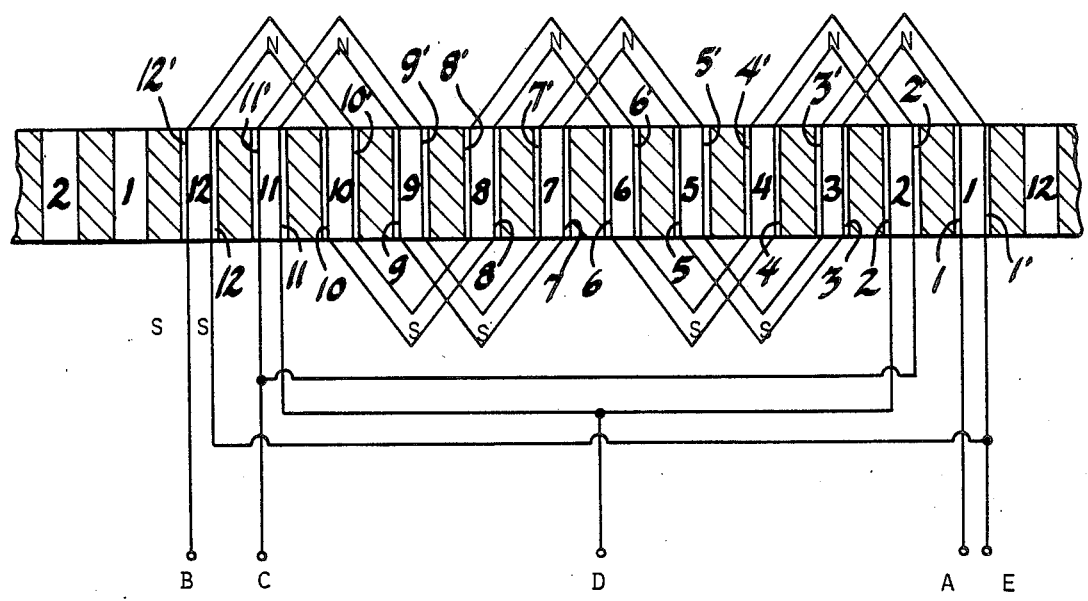
FIGS. 4-5 depict a bifilar embodiment of a self-starting single-phase motor according to this invention, and a computer-based control unit therefor.
Figure 5:
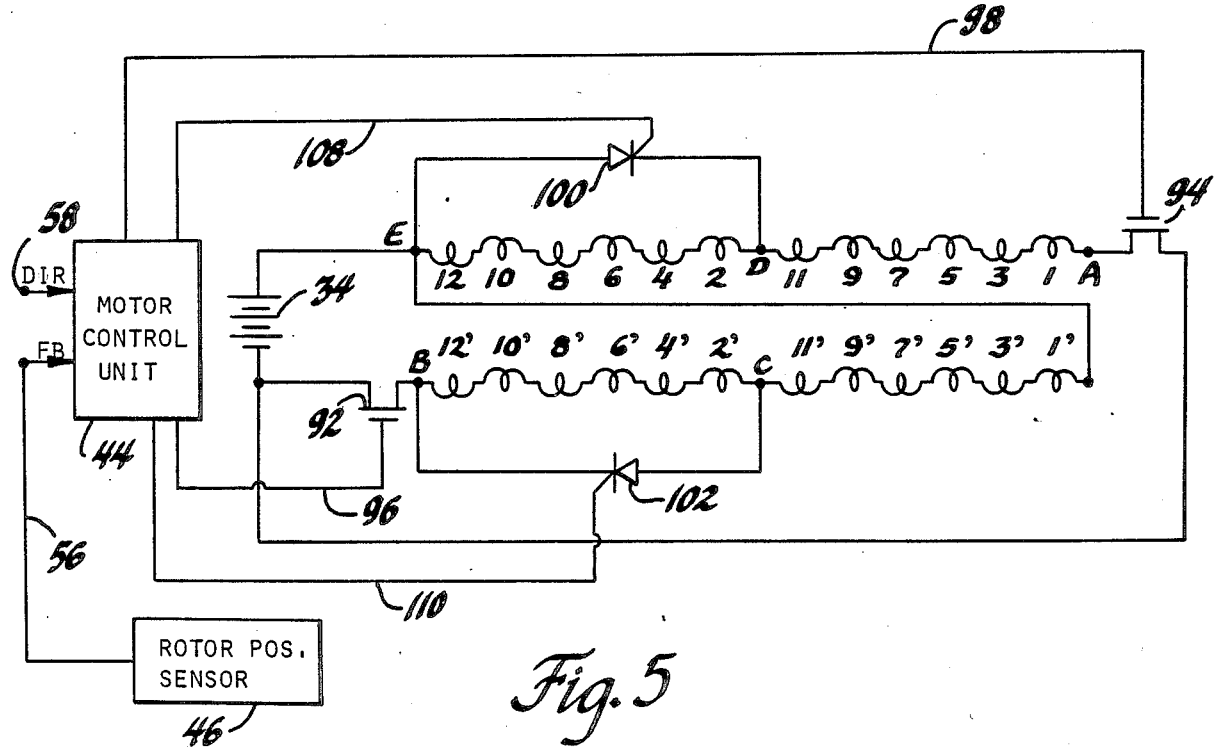

A bifilar embodiment of the self-starting single-phase motor of this invention is depicted in FIGS. 4-5. The number of power transistors required is halved relative to the monofilament arrangement. As with the monofilament embodiment, the bifilar embodiment is wound with two element sections displaced in space by 90 electrical degrees. However, each section is simultaneously wound with a pair of insulated wires as indicated in the schematic diagram of FIG. 4, for an actual total of four sections. For simplicity, single conductor windings are depicted. The section comprising the primed and unprimed even-numbered coils 2-12 and 2'-12' is displaced in space relative to the section comprising the primed and unprimed odd-numbered coils 1-11 and 1'-11'. Successive coils in each section are wound in the opposite sense, as indicated. The section comprising the unprimed odd-numbered coils 1-11 is connected to the terminals A and D; the section comprising the primed odd-numbered coils 1'-11' is connected to the terminals C and E; the section comprising the unprimed even-numbered coils 2-12 is connected to the terminals D and E; and the section comprising the primed even-numbered coils 2'-12' is connected to the terminals B and C.

The primed and unprimed winding sections as defined above are alternately energized with unidirectional current from battery 34 through the power transistors 92 and 94. The positive terminal of battery 34 is connected to the terminal E. The transistor 92 is biased conductive to energize the primed winding sections with current in the direction from terminal E to terminal B for clockwise (CW) rotation; and the transistor 94 is rendered conductive to energize the unprimed winding sections with current in the direction from terminal E to terminal A for counterclockwise (CCW) rotation.

Analogously with the monofilament embodiment of FIGS. 2-3, the control unit 44 controls the conduction of transistors 92 and 94 via lines 96 and 98 in accordance with the feedback signal (FB) on line 56 and the direction signal (DIR) on line 58. The winding utilization is different than the monofilament but the starting torque vs. rotor position relationship is the same as defined in FIG. 1.

In the bifilar embodiment, the control unit 44 is adapted to selectively short circuit one of the energized winding sections for shifting the motor field by 45 electrical degrees. The reference numerals 100-102 designate unidirectional switching devices such as silicon controlled rectifiers (SCRs) for performing the momentary short circuiting function. The SCR 100 shunts the even-numbered unprimed section; and the SCR 102 shunts the even-numbered primed section. The SCRs 100-102 are controlled by the control unit 44 via the lines 108-110.

If the initial winding energization does not produce rotor movement, the SCRs 100 and 102 are momentarily gated into conduction to shift the motor field in the negative direction by 45 electrical degrees as indicated by the trace 22 in FIG. 1. This produces an instantaneous increase in starting torque for initiating rotor movement in the clockwise direction. Thereafter, the SCRs 100-102 are commutated by the negative generated voltage across the respective winding section, and the full length of the respective winding element pair (primed or unprimed) is utilized to accelerate the rotor to its running speed.

The operation of the control unit 44 in performing the self-start function with the bifilar winding arrangement is analogous to that described above in reference to the monofilament embodiment. Indeed, the flow diagram of FIG. 6 is equally applicable.

In view of the above, it will be understood that this invention provides an improved single-phase motor which is self-starting even when the rotor is initially in a null position. In both embodiments, the energized stator winding comprises two serially connected sections which are fully utilized in the run mode. In the start mode, an electronic switching device(s) is adapted to momentarily shunt one of the serially connected sections to effect a momentary shift in the motor field if it is detected that the rotor is in a null position.

Obviously, various modifications to the illustrated embodiments will occur to those skilled in the art. For example, the SCRs 100-102 could be replaced with transistors if desired. In this regard, it should be understood that arrangements incorporating these and other modifications may fall within the scope of this invention, which is defined by the appended claims.

The embodiments of the invention in which an exclusive property or privilege is claimed are defined as follows:

1. A self-starting brushless DC motor with symmetrical stator and rotor air gap geometry and control arrangement therefor, comprising in combination:
   a permanent magnet rotor, a multi-pole stator having a single-phase full winding disposed thereon, such full winding comprising two serially connected sections relatively displaced on the stator such that energization of the full winding defines a run mode magnetic field pole substantially midway between similar field poles of adjacent winding sections, a controlled switch element connected across one of the serially connected stator winding sections and selectively actuable to short circuit such section, and a controller effective to energize the full winding with a source of direct current in accordance with the rotary position of the rotor to produce torque for turning the rotor in a desired direction, the controller being further effective when energizing the winding to initiate rotation of the rotor to momentarily actuate said controlled switch element if the rotor is in a null position for which such energization fails to produce sufficient torque for turning the rotor, thereby to momentarily shift the magnetic field pole in proportion to the relative displacement of the stator winding sections, and provide increased torque for successfully initiating turning of the rotor.

2. A motor and control arrangement as set forth in claim 1, wherein:
- the direction of current energization through the winding determines the direction of motor rotation; and
- the controlled switch element is a bidirectional current control device.

3. A motor and control arrangement as set forth in claim 1, wherein:
- each winding section comprises two simultaneously wound conductors to form two alternately energizable windings; and
- a unidirectional current controlled switch element connected across one section of each such winding.

* * * * *